(12) United States Patent
Charron et al.

(10) Patent No.: US 9,309,774 B2
(45) Date of Patent: Apr. 12, 2016

(54) ASSEMBLY FOR DIRECTING COMBUSTION GAS

(71) Applicant: Siemens Energy, Inc., Orlando, FL (US)

(72) Inventors: Richard C. Charron, West Palm Beach, FL (US); David A. Little, Chuluota, FL (US); Gary D. Snyder, Jupiter, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 249 days.

(21) Appl. No.: 14/155,406

(22) Filed: Jan. 15, 2014

(65) Prior Publication Data

US 2015/0198054 A1 Jul. 16, 2015

(51) Int. Cl.
| | |
|---|---|
| *F01D 9/04* | (2006.01) |
| *F01D 9/02* | (2006.01) |
| *F23R 3/50* | (2006.01) |
| *F23R 3/60* | (2006.01) |
| *F23R 3/46* | (2006.01) |
| *F02C 3/14* | (2006.01) |

(52) U.S. Cl.
CPC ............. *F01D 9/047* (2013.01); *F01D 9/023* (2013.01); *F23R 3/50* (2013.01); *F23R 3/60* (2013.01); *F02C 3/14* (2013.01)

(58) Field of Classification Search
CPC .................... F01D 9/023; F23R 3/46
See application file for complete search history.

(56) References Cited

U.S. PATENT DOCUMENTS

| | | | |
|---|---|---|---|
| 7,721,547 B2 | 5/2010 | Bancalari et al. | |
| 8,065,881 B2 | 11/2011 | Charron et al. | |
| 8,113,003 B2 | 2/2012 | Charron et al. | |
| 8,230,688 B2 | 7/2012 | Wilson et al. | |
| 8,276,389 B2 | 10/2012 | Charron et al. | |
| 2011/0203282 A1 | 8/2011 | Charron et al. | |
| 2011/0259015 A1 | 10/2011 | Johns et al. | |
| 2012/0272521 A1 | 11/2012 | Lee et al. | |
| 2013/0239585 A1* | 9/2013 | Morrison .............. | F01D 9/023 60/805 |

OTHER PUBLICATIONS

PCT International Search Report mailed Jun. 30, 2015 corresponding to PCT International Application No. PCT/US2015/011494 filed Jan. 15, 2015 (5 pages).

* cited by examiner

*Primary Examiner* — Ehud Gartenberg
*Assistant Examiner* — Filippo Manfredi

(57) ABSTRACT

An arrangement is provided for delivering gases from a plurality of combustors of a can-annular gas turbine combustion engine to a first row of turbine blades including a first row of turbine blades. The arrangement includes a gas path cylinder, a cone and an integrated exit piece (IEP) for each combustor. Each IEP comprises an inlet chamber for receiving a gas flow from a respective combustor, and includes a connection segment. The IEPs are connected together to define an annular chamber extending circumferentially and concentric to an engine longitudinal axis, for delivering the gas flow to the first row of blades. A radiused joint extends radially inward from a radially outer side of the inlet chamber to an outer boundary of the annular chamber, and a flared fillet extends radially inward from a radially inner side of the inlet chamber to an inner boundary of the annular chamber.

16 Claims, 5 Drawing Sheets

ASSEMBLY FOR DIRECTING COMBUSTION GAS

STATEMENT REGARDING FEDERALLY SPONSORED DEVELOPMENT

Development for this invention was supported in part by Contract No. DE-FC26-05NT42644, awarded by the United States Department of Energy. Accordingly, the United States Government may have certain rights in this invention.

FIELD OF THE INVENTION

This invention relates to gas turbine combustion engines. In particular, this invention relates to an assembly for transporting expanding gases to the first row of turbine blades in a turbine engine.

BACKGROUND OF THE INVENTION

Gas turbine combustion engines with can-annular combustors require structures to transport the gases coming from the combustors to respective circumferential portions of the first row of turbine blades, hereafter referred to simply as the first row of turbine blades. These structures must orient the flow of the gases so that the flow contacts the first row of turbine blades at the proper angle, to produce optimal rotation of the turbine blades. Conventional structures include a transition, a vane, and seals. The transition transports the gases to the proper axial location and directs the gases into the vanes, which orient the gas flow circumferentially as required and deliver the gas flow to the first row of turbine blades. The seals are used in between the components to prevent cold air leakage into the hot gas path.

Configurations of this nature reduce the amount of expansion potential present in the gas flow as the flow travels toward the first row of turbine blades, and inherently require substantial cooling. Gas flow expansion potential is lost through turbulence created in the flow as the flow transitions from one component to the next, and gas energy is reduced from cold air leakage into the hot gas path. Cold air leakage into the hot gas path through seals increases as seals wear due to vibration and ablation Significant energy is also lost when the flow is redirected by the vanes. These configurations thus create inefficiencies in the flow which reduce the ability of the gas flow to impart rotation to the first row of turbine blades.

In addition, manufacture of the cooled components can be expensive and complicated due to the cooling structures, exacting tolerance requirements, and required shapes. Additionally, the cooled components require a supply of cooling fluid from the engine, with an associated expenditure of energy to produce the flow of cooling fluid.

SUMMARY OF THE INVENTION

In accordance with an aspect of the invention, an arrangement is provided for delivering gases from a plurality of combustors of a can-annular gas turbine combustion engine to a first row of turbine blades. The arrangement comprises a gas path cylinder, a cone and an integrated exit piece (IEP) for each combustor, wherein each IEP comprises a straight path portion for receiving a gas flow from a respective combustor via the cylinder and cone, and the IEP further includes a connection segment. Each IEP connects to an adjacent IEP at the connection segment of the adjacent IEP, and the connected IEPs define an annular chamber that extends circumferentially and is oriented concentric to a gas turbine engine longitudinal axis, for delivering the gas flow to the first row of blades. Gases flow from respective combustors, through respective straight path portions, and into the annular chamber. Each straight path portion comprises four side walls forming a closed polygonal cross section at an inlet end of the straight path portion. Adjacent pairs of side walls are connected by radiused joints, defined by four radiused joints extending from an upstream location toward an exit end of the IEP. At least two of the joints have a constant radius from the upstream location to the exit end and at least one of the joints has a radius that is greater than the radii of the at least two joints.

The four side walls of the straight path portion may be defined by a radially outer side wall opposite to a radially inner side wall, and the radially outer and inner side walls may be coupled together with opposed forward and aft side walls, and the forward side wall may define a continuous side wall from an upstream end of the straight path portion to the exit end of the IEP. Further, the outer side wall may be bounded by forward and aft longitudinal edges extending in the direction of a flow axis for the straight path portion, the aft side wall may be bounded by inner and outer aft wall edges, the outer aft wall edge extending in the direction of the flow axis parallel to the aft longitudinal edge of the outer side wall, wherein the at least one joint may be defined by a joint panel extending between the aft longitudinal edge of the outer side wall and the outer aft wall edge of the aft side wall. Additionally, a width of the joint panel, from the aft longitudinal edge to the outer aft wall edge, may be at least as great as a width of the outer side wall, from the forward longitudinal edge to the aft longitudinal edge.

The IEP may include a transition segment forming an interface section between the upstream end of the straight path portion and a cone connected to an upstream end of the IEP.

The inner side wall may be bounded by forward and aft longitudinal edges extending in the direction of a flow axis for the straight path portion, the connection segment may include a connection segment forward wall extending circumferentially from an upstream location to a downstream edge, and may include a flared fillet extending from the aft longitudinal edge of the inner side wall to the downstream edge of the connection segment forward wall. Further, the straight path portion may be open to the annular camber along a common plane beginning at a convergence flow junction (CFJ), and the flared fillet has an apex at the CFJ and has opposing edges that diverge from the CFJ. Additionally, the aft longitudinal edge of the inner side wall may converge toward the forward longitudinal edge of the inner side wall, extending from the CFJ toward the exit end of the IEP. The connection segment may include an outer circumferentially curved triangular panel extending downstream at a radial outer edge of the connection segment forward wall, and may include an inner circumferentially curved triangular panel extending downstream at a radial inner edge of the connection segment forward wall, and wherein upstream edges of the outer and inner circumferentially curved triangular panels can form junctions with respective downstream edges of outer and inner side walls of an upstream adjacent flow directing structure.

In accordance with another aspect of the invention, an arrangement is provided for conveying combustion gas from a plurality of can-annular combustors of a gas turbine combustion engine to a first row of turbine blades. The arrangement comprises a plurality of gas path cylinders, cones and interconnected integrated exit piece (IEP) sections, the IEPs defining an annular chamber for delivering gas to the first row of turbine blades, the annular chamber being oriented concentric to a gas turbine engine longitudinal axis upstream of the first row of blades. Each respective IEP comprises an inlet chamber defining a first flow path receiving a first flow from a respective cone along a respective common axis therebetween. The inlet chamber includes a generally planar inlet chamber outer side wall bounded by forward and aft outer longitudinal edges extending in the direction of the common axis; a generally planar inlet chamber inner side wall opposing the outer side wall and bounded by forward and aft inner longitudinal edges extending in the direction of the common axis; opposing generally planar inlet chamber forward and aft side walls extending between the inlet chamber outer and inner side walls; and the inlet chamber outer side wall is connected to the inlet chamber forward and aft side walls at respective radially outer forward and aft outer radius portions, and the inlet chamber inner side wall is connected to the inlet chamber forward side wall at a radially inner forward radius portion. Each IEP additionally comprises a connection segment defining a second flow path receiving a partially bounded second flow from an upstream adjacent IEP and delivering at least part of the second flow to the first row of blades. The connection segment includes a generally planar connection segment forward wall, and connection segment outer and inner walls connected to and extending aft from the connection segment forward wall. The inlet chamber inner side wall is connected to the connection segment forward wall by a flared fillet having longitudinal edges that diverge in a downstream flow direction.

One of the longitudinal edges of the flared fillet may coincide with the aft longitudinal edge of the inlet chamber inner side wall. Additionally, the forward and aft longitudinal edges of the inlet chamber inner side wall may converge extending from an inlet end toward an outlet end of the inlet chamber.

The longitudinal edges of the flared fillet may be defined by forward and aft longitudinal edges, and the flared fillet may angle radially inward from the forward longitudinal edge to the aft longitudinal edge.

The connection segment outer and inner walls may comprise respective outer and inner circumferentially curved triangular panels extending downstream, and upstream edges of the outer and inner circumferentially curved triangular panels can form junctions with respective downstream edges of inlet chamber outer and inner side walls of an upstream adjacent IEP.

The aft outer radius portion may be defined by a joint panel having a span extending between the aft longitudinal edge of the inlet chamber outer side wall and an outer edge of the aft side wall. Further, the span of the joint panel may angle radially inward from the aft longitudinal edge of the inlet chamber outer side wall to the outer edge of the aft side wall. Additionally, a width of the joint panel, as measured along the span of the joint panel, may be at least as great as a width of the inlet chamber outer side wall between the forward and aft longitudinal edges.

The IEP may include a transition segment forming an interface section between the upstream end of the inlet chamber and a cone connected to an upstream end of the IEP.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

Figure 1:
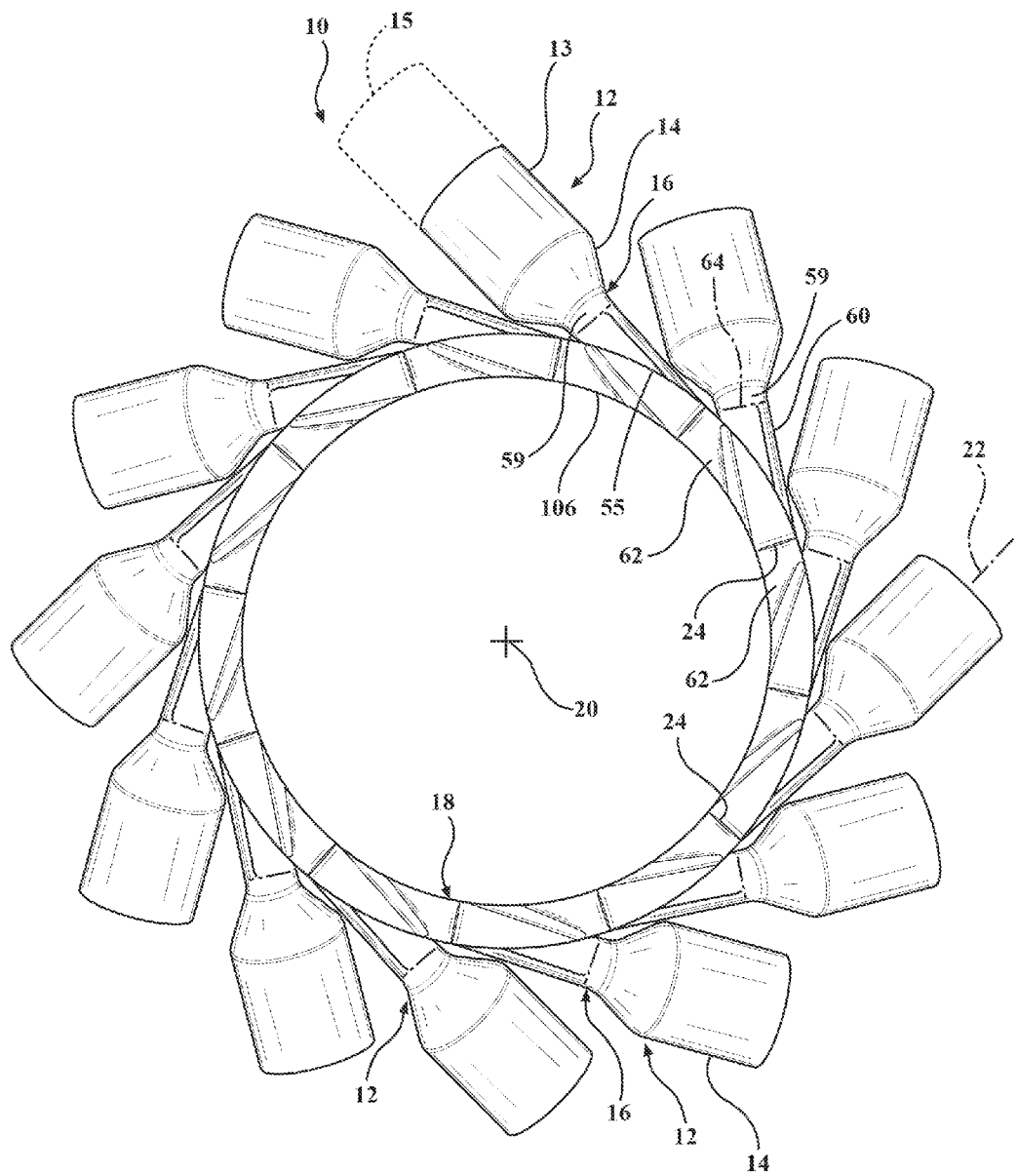
FIG. 1 is an axial view, directed from aft to forward in an engine, of an assembled arrangement in accordance with aspects of the invention.

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

In accordance with aspects of the invention, combustor cans of a gas turbine engine are reoriented to permit the use of an assembly of components that direct individual gas flows from the combustor cans of a can-annular combustor of a gas turbine combustion engine into a singular annular chamber immediately upstream and adjacent the first row of turbine blades. Further, in accordance with aspects of the present invention, it has been observed that prior configurations for delivering flows from can-annular combustors to the first row of turbine blades kept each flow separate and distinct from the other flows all the way to the first row of turbine blades. As a result, between each flow about to contact the first row of turbine blades there is a gap, or trailing edge, where there is reduced flow delivered to the blades. These trailing edges, which vary in magnitude from design to design, can create flow disturbances and associated energy losses Consequently, as the first row blades rotate, they alternately see regions of a high volume of very hot flow, and cooler regions of reduced flow. The blades thus experience rapidly changing temperatures and aerodynamic loads as they rotate through these regions, and these oscillations can shorten blade life The assembly of the invention eliminates walls between adjacent flows in the annular chamber. Eliminating the walls between adjacent flows eliminates trailing edges associated with the walls, and the accompanying energy losses.

A recent design innovation, as disclosed in commonly assigned U.S. Pat. No. 7,721,547 to Bancalari et al., incorporated herein by reference, replaces the conventional transition, seals, and vanes with an assembly of one piece transition ducts that transport expanded gases from the combustion chamber directly to the first row of turbine blades, while simultaneously orienting the gas flow to properly interface with the first row of turbine blades. This orienting is achieved by curving and shaping each duct, and consequently each respective gas flow, along its length.

Another recent design innovation, as disclosed commonly assigned U.S. Pat. No. 8,065,881 to Charron, incorporated herein by reference, orients the combustor cans of the gas turbine combustor to permit the use of an assembly of components that form a straight path between each combustor can and a respective circumferential portion of the first row of turbine blades. In the Charron configuration, gases flowing from each combustor can flow along an individual straight path, without mixing with any other flows, exit the assembly, and flow into the first row of turbine blades. As a result of these straight paths, there are fewer aerodynamic energy losses, and thus a greater amount of energy is delivered to the first row of turbine blades. The current arrangement improves upon the ideas presented in the incorporated documents.

The arrangement comprises multiple sets of flow directing structures, one for each combustor. Each flow directing structure may include a gas path cylinder, a cone and an associated integrated exit piece ("IEP"). A combustor in a conventional gas turbine engine may be oriented radially inward and axially downstream with respect to a gas turbine engine longitudinal axis. However, the combustor cans in a gas turbine engine that uses the present arrangement may be oriented circumferentially and downstream with respect to the gas turbine engine longitudinal axis.

Combustion gas exits the combustor along a straight gas flow path longitudinal axis and is constrained discretely from other combustion gas flows emanating from other combustor cans until all gas flows reach a common annular chamber. Once in the annular chamber the gas flows may deviate from respective straight gas flow longitudinal axes, and the gas flows are no longer separated by structural walls. The gas flows then exit the annular chamber through the annular chamber outlet. The annular chamber outlet comprises a plane perpendicular to a downstream end of the annular chamber, where the gas flows to the first row of turbine blades.

Referring to FIG. 1, an axial view of the arrangement 10 is illustrated, as viewed in the forward direction. As referred to herein, a forward view means looking from the exhaust end toward the inlet end along the gas turbine engine longitudinal axis, and aft view means the opposite direction. When speaking of flows, forward refers to an engine inlet side, and aft refers to an engine exhaust side with respect to the longitudinal axis of the gas turbine engine. Inner and outer refer to radial positions with respect to the gas turbine engine longitudinal axis. Adjacent refers to items circumferentially adjacent with respect to the gas turbine longitudinal axis. In the disclosed embodiment, the gas turbine engine rotates counterclockwise when looking in the aft direction, i.e. when looking from the forward end to the aft end with respect to the gas turbine longitudinal axis. However, the entire disclosure is also considered to encompass gas turbine engines that rotate clockwise when looking in the aft direction, and the components described and illustrated herein would simply be reoriented. Upstream adjacent in this embodiment means upstream with respect to the direction of rotation of the gas turbine engine, and adjacent means circumferentially adjacent. Downstream adjacent means downstream with respect to the direction of rotation of the gas turbine engine and circumferentially adjacent. Thus, during rotation, a blade would encounter an upstream component of the assembled arrangement before encountering a downstream component.

The arrangement 10 comprises of multiple sets of flow directing structures 12. There is a flow directing structure 12 for each combustor (one combustor 15 illustrated diagrammatically in FIG. 1). The combustion gases from each combustor flow into a respective flow directing structure 12. Each flow directing structure includes a gas flow cylinder 13, a cone section 14 and an PEP 16 The IEPs 16 together form an annular chamber 18, as will be described further below. Each gas flow enters the annular chamber 18 at discrete intervals circumferentially at an orientation that includes a circumferential component and an axial component with respect to the gas turbine engine longitudinal axis 20. Each gas flow originates in its respective combustor can and is directed as a discrete flow to the annular chamber 18. When discrete, each flow is separated by walls, but in the annular chamber 18 the flows are not separated by walls. The flows are still constrained to the annular chamber 18, but they are not separated from each other Each IEP 16 abuts an adjacent IEP at IEP joints 24.

Figure 3:
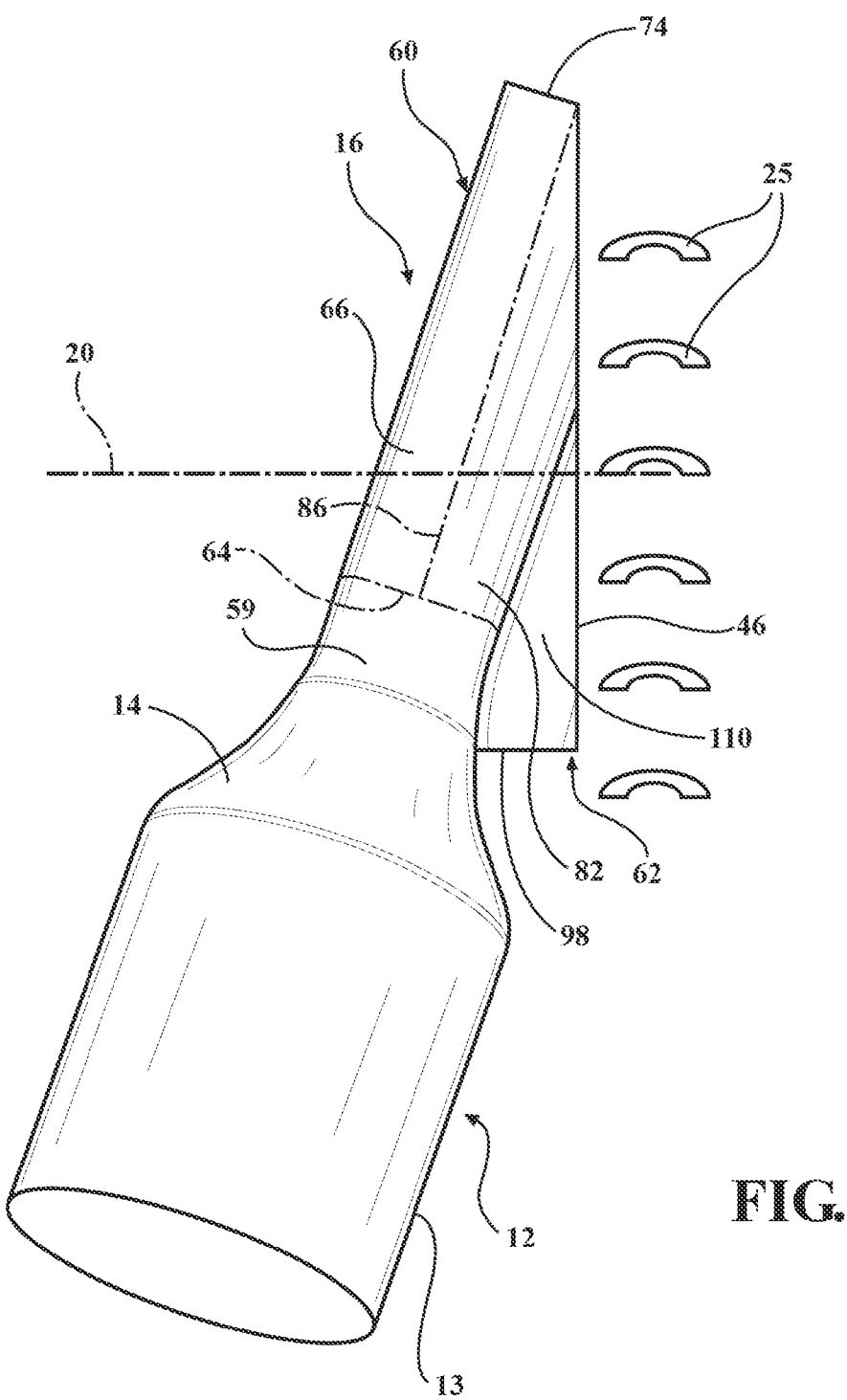
FIG. 3 is a view taken radially inward of a flow directing structure in accordance with aspects of the invention.

Immediately downstream of the annular chamber 18 is the first row of turbine blades 25 (FIG. 3). In conventional can-annular gas turbine combustion engines each flow is discrete until it leaves a transition immediately upstream of the first stage which, in the conventional gas turbine engine includes flow directing vanes and then a row of blades. The transitions keep the flows discrete until just before encountering flow directing vanes. The flow directing vanes may further divide the discrete flows prior to each flow reaching the blades. As such, the blades see varying amounts of combustion gases as they rotate through the divided flows. The annular chamber 18 eliminates any walls that separate the flows, and also eliminates the first row of flow directing vanes that divide the flows. As a result, the flows are not divided, but rather are essentially a single, annular flow immediately prior to entering the first row of turbine blades. Once in the annular chamber 18, the walls that defined the forward and aft sides of each flow upstream cease to do so. In addition, the walls that define the inner and outer sides of the flow are configured to transition from straight walls to arcuate walls that partially define the annular chamber 18. As the gas flow path continues circumferentially through the annular chamber it simultaneously advances along the gas turbine longitudinal axis to an annular chamber outlet 46 (FIG. 3).

Figure 2:
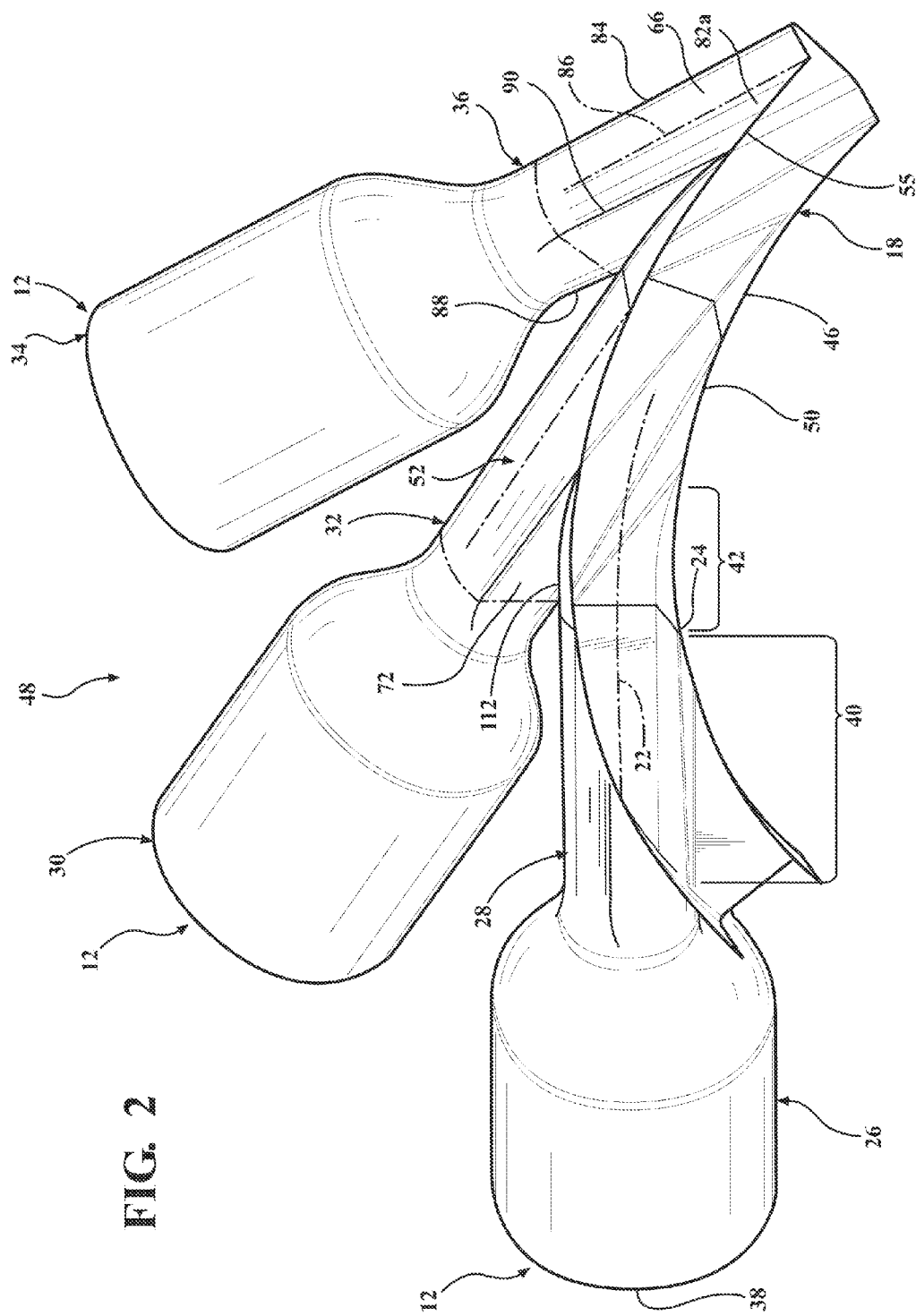
FIG. 2 is a perspective view of a partial arrangement of the arrangement of FIG. 1.

Referring to FIG. 2, a partial arrangement 48 of the arrangement 10 is illustrated, showing three flow directing structures 12. There is what is termed an associated flow directing structure 26 comprising an associated IEP 28; there is a downstream adjacent flow directing structure 30 comprising a downstream adjacent IEP 32; and there is a further downstream flow directing structure 34 comprising a further downstream IEP 36. The overall gas flow path begins at a cylinder upstream end 38, travels along a gas flow axis 22 through an associated IEP first flow path 40 and then through a downstream adjacent IEP second flow path 42. It may be understood that the overall gas flow path aft boundary traverses the annular chamber outlet 46 at some point along the downstream adjacent IEP second flow path 42, at a point after traversing the junction 24 between the associated IEP 28 and the downstream IEP 32.

In the partial arrangement 48 of the arrangement 10, as illustrated in FIG. 2, it can be seen that the gas flow path longitudinal axis 22 remains straight in the associated IEP first flow path 40 and is curved in the downstream adjacent IEP second flow path 42 at a curvature corresponding to the radius of the annular chamber 18.

Referring to FIGS. 1 and 3, the IEP 16 is shown as including a transition segment 59 joined to an upstream end 64 of the straight path portion 60 forming an inlet chamber for receiving a gas flow from a respective combustor. The IEP 16 further includes a connection segment 62. A downstream end 74 of each IEP 16 connects to an upstream end or location 98 of the connection segment 62 of a downstream adjacent IEP 16. A hot working gas flows from respective combustors, through respective straight path portions 60, and into the annular chamber 18 as respective straight gas flows.

The straight path portion 60 comprises four side walls forming a closed polygonal cross section at an inlet end 64 of the straight path portion 60. The four side walls of the straight path portion 60 comprises a generally planar radially outer side wall 66 opposite to a generally planar radially inner side wall 68. The radially outer and inner side walls 66, 68 are coupled together with opposed generally planar forward and aft side walls 70, 72. The forward side wall 70 defines a continuous side wall from an upstream end, i.e., at the inlet end 64, of the straight path portion 60 to the exit end 74 of the IEP 16.

Figure 5:
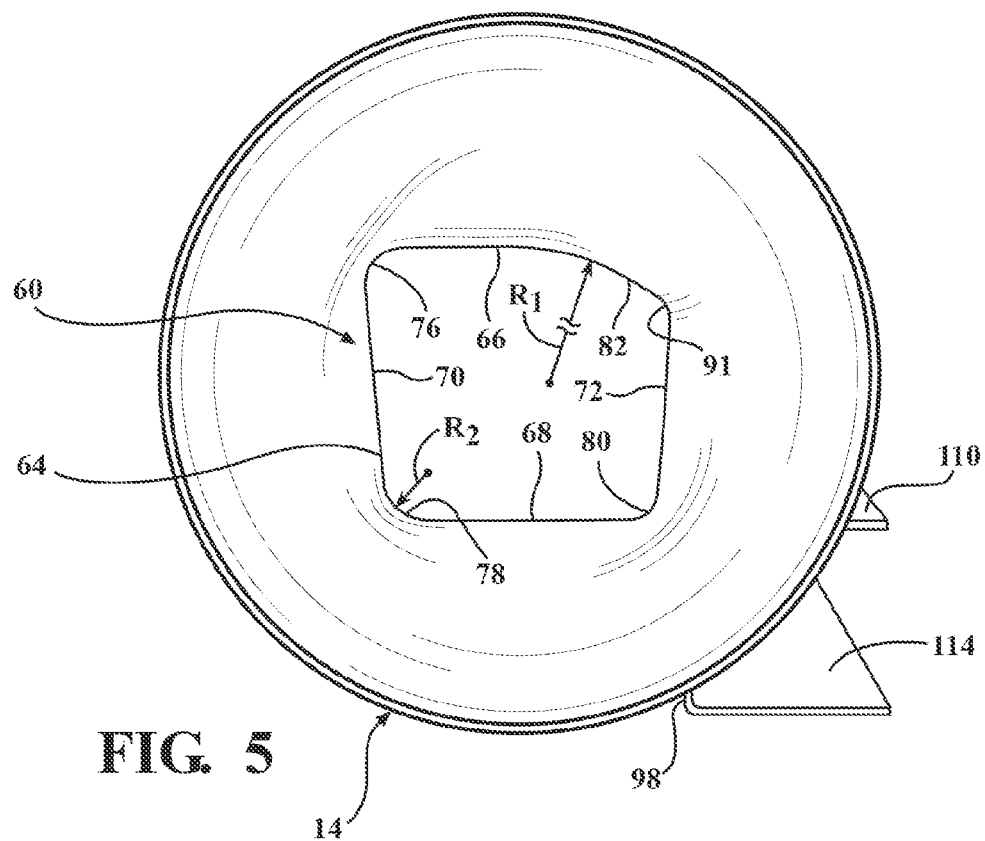
FIG. 5 is an end view directed into an inlet chamber of a flow directing structure in accordance with aspects of the invention.

Referring particularly to FIG. 5, adjacent pairs of side walls 66, 68, 70, 72 are connected by radius portions or radiused joints, defined by four radiused joints extending from an upstream location, i.e., the inlet end 64, toward the exit end 74 of the IEP 16. In particular, the adjacent outer side wall 66 and forward side wall 70 are connected by an outer forward radius portion or joint 76 having a constant radius extending along a line parallel to the flow axis 22; the adjacent inner side wall 68 and forward side wall 70 are connected by an inner forward radius portion or joint 78 having a constant radius extending along a line parallel to the flow axis 22; the adjacent inner side wall 68 and aft side wall 72 are connected by an inner aft radius portion or joint 80 having a constant radius extending along a line parallel to the flow axis 22; and the adjacent outer side wall 66 and aft side wall 72 are connected by an outer aft radius portion or joint 82 having a constant radius extending along a line parallel to the flow axis 22. In general, at least the joint 82 has a radius $R_1$ that is greater than the radii of at least two of the remaining joints 76, 78, 80, as depicted by exemplary radius $R_2$ of joint 78. For example, the radii of any one of the joints 76, 78, 80, e.g., radius $R_2$ may be less than the length of any one of the side walls 66, 68, 70, 72, while the radius $R_1$ of the joint 82 may be at least as great as the length of any of the side walls 66, 68, 70, 72, as viewed for example in FIG. 5.

Figure 4:
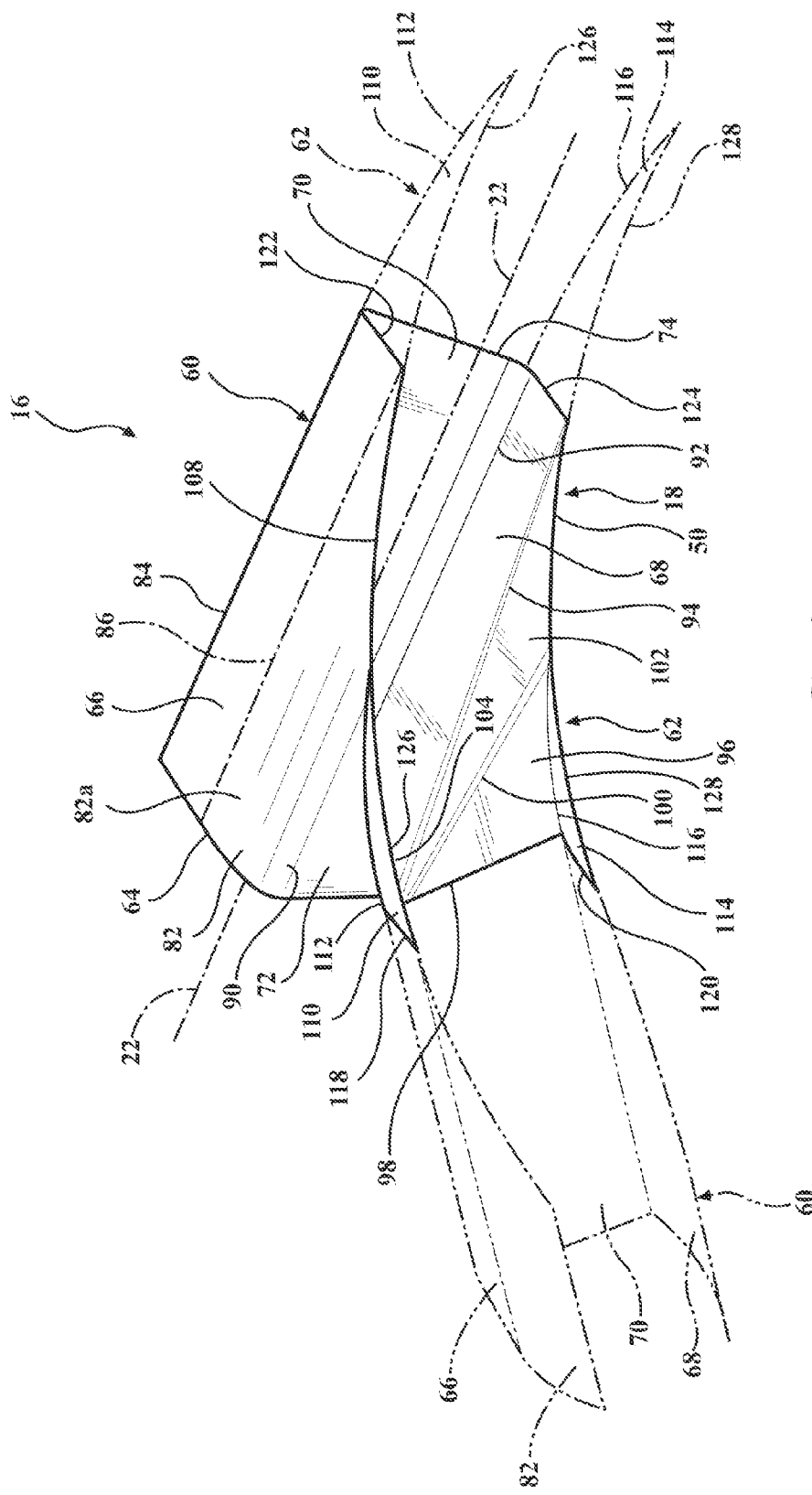
FIG. 4 is a perspective view of an integrated exit piece, without a transition segment, in accordance with aspects of the invention.

As seen in FIG. 4, the outer side wall 66 is bounded by a forward longitudinal edge 84 and an aft longitudinal edge 86 extending parallel to the flow axis 22. The aft side wall 72 is bounded by an inner aft wall edge 88 (FIG. 2) and an outer aft wall edge 90. The outer aft wall edge 90 extends in the direction of the flow axis 22 parallel to the aft longitudinal edge 86 of the outer side wall 66. It can be seen that the joint 82 is defined by a joint panel 82a having a span extending between the aft longitudinal edge 86 of the outer side wall 66 and the outer aft wall edge 90 of the aft side wall 72, and defines a flow contour extending axially downstream and radially inward to blend the flow in the straight flow portion 60 with the flow in the annular chamber 18. In particular, the joint panel 82a defines an outer flow boundary that angles radially inward to transition the flow from the straight flow portion 60 in a radial inward direction to an outer boundary 55 of the annular flow defined by the annular chamber 18 (see FIGS. 1 and 2).

It should be understood that the span of the joint panel 82a is defined by a substantial axial dimension, or width, in order to provide a relatively large radius to transition the flow to the outer boundary 55 of the annular chamber 18. For example, a width of the joint panel 82a, from the aft longitudinal edge 86 of the outer side wall 66 to the outer aft wall edge 90 of the aft side wall 72, is at least as great as a width of the outer side wall 66, as measured from the forward longitudinal edge 84 to the aft longitudinal edge 86. Further, the joint between the joint panel 82a and the aft side wall 72, at the outer aft wall edge 90, is preferably defined by a further radius 91 (FIG. 5).

The inner side wall 68 is bounded by a forward longitudinal edge 92 and an aft longitudinal edge 94 extending in the direction of the flow axis 22 for the straight path portion 60. Further, the connection segment 62 includes a generally planar connection segment forward wall 96 extending circumferentially from the upstream location 98 to a downstream edge 100. A flared fillet 102 extends in a generally axial direction from the aft longitudinal edge 94 of the inner panel 68 to the downstream edge 100 of the connection segment forward wall 96. The flared fillet 102 has opposing edges that are generally contiguous with the respective edges 94, 100 of the inner side wall 68 and the connection segment forward wall 96. It should be understood that the edges 94, 100 are preferably formed as radiused edges to provide a smooth transition between adjacent elements 68, 102, 96, as is depicted, for example, by double lines forming the edges 94, 100 in FIG. 4.

The straight path portion 60 is open to the annular chamber 18 along a common plane beginning at a convergence flow junction (CFJ) 104. The common plane can generally be defined as a plane that is coplanar with the aft side wall 72 of the straight path portion 60, and extends downstream from the CFJ 104. The flared fillet 102 has an apex at the CFJ 104, and has opposing edges, i.e., contiguous with the edges 94, 100, that diverge from the CFJ 104 in the downstream direction. The flared fillet 102 angles radially inward and provides a controlled radial transition to minimize disruption of flow at the radial inner side of the gas flow as the flow passes from the straight flow path 60 into the annular chamber 18.

As seen in FIG. 4, the forward longitudinal edge 92 of the inner side wall 68 extends parallel to the flow axis 22, and the aft longitudinal edge 94 of the inner side wall 68 converges toward the forward longitudinal edge 92 of the inner side wall 68, extending from the CFJ 104 toward the exit end 74 of the IEP 16.

The aft longitudinal edge 94 of the inner side wall 68 converges with an inner aft or downstream edge 50 of the flared fillet 102, extending in a direction from the CFJ toward a downstream end of the edges 50, 94. It should be noted that the joint panel 82 defines an outer downstream edge 108 circumferentially aligned with the aft edge 50 and lying in a common radial plane perpendicular to the engine longitudinal axis 20 at the annular chamber outlet 46. Further, it may be noted the inner downstream edge 50 has a curvature corresponding to the inner radius of the annular chamber 18, and the outer downstream edge 108 has a curvature corresponding to the outer radius of the annular chamber 18.

The connection segment 62 includes an outer circumferentially curved triangular panel 110 extending downstream at a radial outer edge 112 of the connection segment forward wall 96, and includes an inner circumferentially curved triangular panel 114 extending downstream at a radial inner edge 116 of the connection segment forward wall 96. Upstream edges 118, 120 of the outer and inner circumferentially curved triangular panels 110, 114 form junctions with respective downstream edges 122, 124 of outer and inner side walls 66, 68 of an upstream adjacent IEP 16, and the connection segment forward wall 96 forms a junction with the forward side wall 70. Hence, the triangular panels 110, 114 and forward wall 96 of the connection segment 62 essentially forms a continuation of the flow path defined through the straight flow path 60 to direct the flow of gases toward the annular chamber 18.

The circumferentially curved panels 110, 114 extend from the connection segment forward wall 96 in an aft direction and include outer and inner aft edges 126, 128 that are located at the annulus chamber outlet 46 and converge toward respective outer and inner edges 112, 116 of the connection segment forward wall 96 in a downstream direction. The inner aft edge 128 has a curvature corresponding to the inner radius of the annular chamber 18, and the outer aft edge 126 has a curvature corresponding to the outer radius of the annular chamber 18.

It should be noted that FIG. 4 includes a dotted line depiction of a next adjacent upstream straight path portion 60 and a next adjacent downstream connection segment 62 (only circumferentially curved panels 110, 114 illustrated). The dotted line depictions of the straight path portion 60 and connection segment 62 illustrate the continuity between the elements forming the adjacent IEPs 16.

Figure 6:
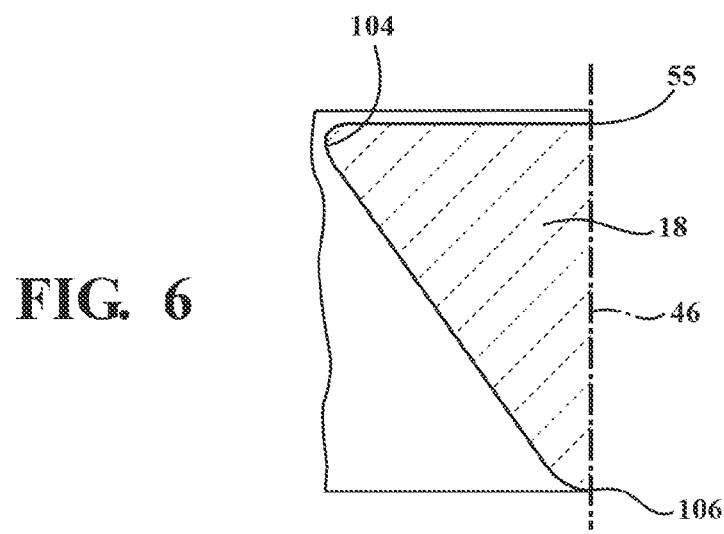
FIG. 6 is a diagrammatic view illustrating a cross-section of the annular chamber, viewed in a circumferential downstream direction.

FIG. 6 illustrates a cross-section of the annular chamber 18, viewed in a circumferential downstream direction, and is highlighted by hatch lines located in the area of the annular chamber 18. Specifically, the annular chamber 18 is defined by an unobstructed area adjacent to the outlet 46, as viewed in the circumferential downstream direction, extending from a forward location at the CFJ 104 to aft locations at the outer and inner edges 55, 106 of the annular chamber 18 located at the outlet 46.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An arrangement for delivering gases from a plurality of combustors of a can-annular gas turbine combustion engine to a first row of turbine blades, the arrangement comprising a gas path cylinder, a cone, and an integrated exit piece (IEP) for each combustor, wherein each IEP comprises a straight path portion for receiving a gas flow from a respective combustor via the cylinder and cone, and the IEP further includes a connection segment, wherein each IEP connects to an adjacent IEP at the connection segment of the adjacent IEP, and the connected IEPs define an annular chamber that extends circumferentially and is oriented concentric to a gas turbine engine longitudinal axis, for delivering the gas flow to the first row of blades; wherein gases flow from respective combustors, through respective straight path portions, and into the annular chamber;

wherein each straight path portion comprises four side walls forming a closed polygonal cross section at an inlet end of the straight path portion, adjacent pairs of side walls being connected by radiused joints, defined by four radiused joints extending from an upstream location toward an exit end of the IEP, at least two of the joints having a constant radius from the upstream location to the exit end and at least one of the joints having a radius that is greater than the radii of the at least two joints;

wherein the four side walls of the straight path portion are defined by a radially outer side wall opposite to a radially inner side wall, and the radially outer and inner side walls are coupled together with opposed forward and aft side walls, and the forward side wall defines a continuous side wall from an upstream end of the straight path portion to the exit end of the IEP;

wherein the inner side wall is bounded by forward and aft longitudinal edges extending in the direction of a flow axis for the straight path portion, the connection segment includes a connection segment forward wall extending circumferentially from an upstream location to a downstream edge, and including a flared fillet, having longitudinal edges that diverge in a downstream flow direction, extending from the aft longitudinal edge of the inner side wall to the downstream edge of the connection segment forward wall.

2. The arrangement of claim 1, wherein the outer side wall is bounded by forward and aft longitudinal edges extending in the direction of a flow axis for the straight path portion, the aft side wall is bounded by inner and outer aft wall edges, the outer aft wall edge extending in the direction of the flow axis parallel to the aft longitudinal edge of the outer side wall, wherein the at least one joint is defined by a joint panel extending between the aft longitudinal edge of the outer side wall and the outer aft wall edge of the aft side wall.

3. The arrangement of claim 2, wherein a width of the joint panel, from the aft longitudinal edge to the outer aft wall edge, is at least as great as a width of the outer side wall, from the forward longitudinal edge to the aft longitudinal edge.

4. The arrangement of claim 1, wherein the IEP includes a transition segment forming an interface section between the upstream end of the straight path portion and a cone connected to an upstream end of the IEP.

5. The arrangement of claim 1, wherein the straight path portion is open to the annular camber along a common plane beginning at a convergence flow junction (CFJ), and the flared fillet has an apex at the CFJ and has opposing edges that diverge from the CFJ.

6. The arrangement of claim 5, wherein the aft longitudinal edge of the inner side wall converges toward the forward longitudinal edge of the inner side wall, extending from the CFJ toward the exit end of the IEP.

7. The arrangement of claim 1, wherein the connection segment includes an outer circumferentially curved triangular panel extending downstream at a radial outer edge of the connection segment forward wall, and includes an inner circumferentially curved triangular panel extending downstream at a radial inner edge of the connection segment forward wall, and wherein upstream edges of the outer and inner circumferentially curved triangular panels form junctions with respective downstream edges of outer and inner side walls of an upstream adjacent flow directing structure.

8. An arrangement for conveying combustion gas from a plurality of can-annular combustors of a gas turbine combustion engine to a first row of turbine blades, the arrangement comprising:

a plurality of gas path cylinders, cones and interconnected integrated exit piece (IEP) sections, the IEPs defining an annular chamber for delivering a gas flow to the first row of turbine blades, the annular chamber being oriented concentric to a gas turbine engine longitudinal axis upstream of the first row of blades;

each respective IEP comprising an inlet chamber defining a first flow path receiving a first flow from a respective cone along a respective common axis therebetween, the inlet chamber including:
a planar inlet chamber outer side wall bounded by forward and aft outer longitudinal edges extending in the direction of the common axis;
a planar inlet chamber inner side wall opposing the outer side wall and bounded by forward and aft inner longitudinal edges extending in the direction of the common axis;
opposing planar inlet chamber forward and aft side walls extending between the inlet chamber outer and inner side walls; and
the inlet chamber outer side wall connected to the inlet chamber forward and aft side walls at respective radially outer forward and aft outer radius portions, and the inlet chamber inner side wall connected to the inlet chamber forward side wall at a radially inner forward radius portion;

a connection segment defining a second flow path receiving a partially bounded second flow from an upstream adjacent IEP and delivering at least part of the second flow to the first row of blades, the connection segment including:

a planar connection segment forward wall; and connection segment outer and inner walls connected to and extending aft from the connection segment forward wall;

the inlet chamber inner side wall connected to the connection segment forward wall by a flared fillet having longitudinal edges that diverge in a downstream flow direction.

9. The arrangement of claim 8, wherein one of the longitudinal edges of the flared fillet coincides with the aft longitudinal edge of the inlet chamber inner side wall.

10. The arrangement of claim 9, wherein the forward and aft longitudinal edges of the inlet chamber inner side wall converge extending from an inlet end toward an outlet end of the inlet chamber.

11. The arrangement of claim 8, wherein the longitudinal edges of the flared fillet are defined by forward and aft longitudinal edges, and the flared fillet angles radially inward from the forward longitudinal edge to the aft longitudinal edge.

12. The arrangement of claim 8, wherein the connection segment outer and inner walls comprise respective outer and inner circumferentially curved triangular panels extending downstream, and wherein upstream edges of the outer and inner circumferentially curved triangular panels form junctions with respective downstream edges of inlet chamber outer and inner side walls of an upstream adjacent IEP.

13. The arrangement of claim 8, wherein the aft outer radius portion is defined by a joint panel having a span extending between the aft longitudinal edge of the inlet chamber outer side wall and an outer edge of the aft side wall.

14. The arrangement of claim 13, wherein the span of the joint panel angles radially inward from the aft longitudinal edge of the inlet chamber outer side wall to the outer edge of the aft side wall.

15. The arrangement of claim 13, wherein a width of the joint panel, as measured along the span of the joint panel, is at least as great as a width of the inlet chamber outer side wall between the forward and aft longitudinal edges.

16. The arrangement of claim 8, wherein the IEP includes a transition segment forming an interface section between an upstream end of the inlet chamber and a cone connected to an upstream end of the IEP.

* * * * *